(12) United States Patent
Hutten

(10) Patent No.: US 10,969,926 B2
(45) Date of Patent: Apr. 6, 2021

(54) CONTENT RESTRICTION IN VIDEO CONTENT SHARING COMMUNITY

(71) Applicant: TapThere, Inc., Newport Beach, CA (US)

(72) Inventor: Curt Hutten, Newport Beach, CA (US)

(73) Assignee: Wormhole Labs, Inc., Huntington Beach, CA (US)

(*) Notice: Subject to any disclaimer, the term of this patent is extended or adjusted under 35 U.S.C. 154(b) by 117 days.

(21) Appl. No.: 15/607,177

(22) Filed: May 26, 2017

(65) Prior Publication Data

US 2017/0264958 A1 Sep. 14, 2017

Related U.S. Application Data

(60) Division of application No. 14/020,556, filed on Sep. 6, 2013, now Pat. No. 10,649,613, which is a
(Continued)

(51) Int. Cl.
*G06F 3/0481* (2013.01)
*G06F 3/048* (2013.01)
(Continued)

(52) U.S. Cl.
CPC .......... *G06F 3/04815* (2013.01); *G06F 3/048* (2013.01); *G06F 16/435* (2019.01);
(Continued)

(58) Field of Classification Search
CPC .. G06F 3/04815; G06F 16/435; G06F 16/437; G06F 16/7867; G06T 19/006
See application file for complete search history.

(56) References Cited

U.S. PATENT DOCUMENTS 5,729,471 A 3/1998 Jain et al.
6,111,582 A 8/2000 Jenkins
(Continued)

FOREIGN PATENT DOCUMENTS

AU 2011211447 9/2011
CA 2425739 9/1998
(Continued)

OTHER PUBLICATIONS

Blumenthal, R., "Conference Caster Pro: Crowdsource your multi-camera video footage", https://code.google.com/p/conference-caster-pro, screen capture Jul. 25, 2013.
(Continued)

*Primary Examiner* — Roland J Casillas
(74) *Attorney, Agent, or Firm* — Fish IP Law, LLP

(57) ABSTRACT

A method of sharing an experience between a tapper and a content provider is provided. In this method, at least two interfaces are provided that are configured to allow the tapper and the content provider to join a content sharing community. A third interface is also provided to allow the tapper to select the content provider from a map where at least one of the tapper and the content provider are unknown to the other prior to the tapper selecting the content provider. Then a solicitation is conveyed from the tapper to the content provider to provide a video feed. In response to the solicitation, a video feed derived from a device operated or carried by the content provider is provided to the tapper. From a video feed, an object is recognized, and the video feed is conveyed to the tapper according to the privacy policy derived from the object.

7 Claims, 5 Drawing Sheets

Related U.S. Application Data continuation-in-part of application No. 13/912,567, filed on Jun. 7, 2013, now Pat. No. 10,700,944.

(60) Provisional application No. 61/676,426, filed on Jul. 27, 2012, provisional application No. 61/676,452, filed on Jul. 27, 2012, provisional application No. 61/676,443, filed on Jul. 27, 2012, provisional application No. 61/676,436, filed on Jul. 27, 2012, provisional application No. 61/676,431, filed on Jul. 27, 2012, provisional application No. 61/675,271, filed on Jul. 24, 2012, provisional application No. 61/675,268, filed on Jul. 24, 2012, provisional application No. 61/675,263, filed on Jul. 24, 2012, provisional application No. 61/675,258, filed on Jul. 24, 2012, provisional application No. 61/656,619, filed on Jun. 7, 2012.

(51) Int. Cl.

| | | |
|---|---|---|
| *G06F 16/435* | (2019.01) | |
| *G06F 16/78* | (2019.01) | |
| *H04N 21/4223* | (2011.01) | |
| *H04N 21/2665* | (2011.01) | |
| *H04N 21/6587* | (2011.01) | |
| *H04N 21/414* | (2011.01) | |
| *H04N 21/218* | (2011.01) | |
| *H04N 21/2187* | (2011.01) | |
| *H04N 21/462* | (2011.01) | |
| *H04N 21/472* | (2011.01) | |
| *H04N 21/4627* | (2011.01) | |
| *G06T 19/00* | (2011.01) | |
| *H04N 21/234* | (2011.01) | |
| *G06Q 30/00* | (2012.01) | |
| *G06Q 30/02* | (2012.01) | |

(52) U.S. Cl.
CPC ........ *G06F 16/437* (2019.01); *G06F 16/7867* (2019.01); *G06T 19/006* (2013.01); *H04N 21/2187* (2013.01); *H04N 21/21805* (2013.01); *H04N 21/23424* (2013.01); *H04N 21/2665* (2013.01); *H04N 21/41407* (2013.01); *H04N 21/4223* (2013.01); *H04N 21/462* (2013.01); *H04N 21/4622* (2013.01); *H04N 21/4627* (2013.01); *H04N 21/47202* (2013.01); *H04N 21/6587* (2013.01); *G06Q 30/00* (2013.01); *G06Q 30/0252* (2013.01)

(56) References Cited

U.S. PATENT DOCUMENTS

| | | | |
|---|---|---|---|
| 6,122,660 | A | 9/2000 | Baransky et al. |
| 6,694,352 | B1 | 2/2004 | Omoigui |
| 7,305,173 | B2 | 12/2007 | Karimoto et al. |
| 7,558,404 | B2 | 7/2009 | Ma et al. |
| 7,657,920 | B2 | 2/2010 | Arseneau et al. |
| 8,037,070 | B2 | 10/2011 | Maghoul |
| 8,081,636 | B2 | 12/2011 | den Hartog et al. |
| 8,230,355 | B1 | 7/2012 | Bauermeister et al. |
| 8,250,616 | B2 | 8/2012 | Davis et al. |
| 8,286,218 | B2 | 10/2012 | Pizzurro et al. |
| 8,520,979 | B2 | 8/2013 | Conwell |
| 2002/0120935 | A1 | 8/2002 | Huber et al. |
| 2003/0105794 | A1 | 6/2003 | Jasinschi et al. |
| 2005/0091596 | A1 | 4/2005 | Anthony et al. |
| 2006/0085392 | A1 | 4/2006 | Wang et al. |
| 2007/0061487 | A1* | 3/2007 | Moore .................. G06F 16/27 709/246 |
| 2007/0130126 | A1 | 6/2007 | Lucovsky et al. |
| 2007/0180027 | A1 | 8/2007 | Boylan |
| 2007/0198485 | A1 | 8/2007 | Ramer et al. |
| 2008/0060029 | A1 | 3/2008 | Park et al. |
| 2008/0192736 | A1 | 8/2008 | Jabri et al. |
| 2009/0063419 | A1 | 3/2009 | Nurminen et al. |
| 2009/0089294 | A1* | 4/2009 | Davis ................ H04N 7/17318 |
| 2009/0153747 | A1 | 6/2009 | Nurminen et al. |
| 2009/0164559 | A1 | 6/2009 | Johnson et al. |
| 2009/0165140 | A1* | 6/2009 | Robinson ................ G06F 21/10 726/26 |
| 2010/0289753 | A1 | 11/2010 | Coddington |
| 2010/0303448 | A1 | 12/2010 | Sariya et al. |
| 2010/0312608 | A1 | 12/2010 | Shan et al. |
| 2011/0047464 | A1 | 2/2011 | McCarthy |
| 2011/0117934 | A1 | 5/2011 | Mate et al. |
| 2011/0173214 | A1 | 7/2011 | Karim |
| 2011/0294569 | A1 | 12/2011 | Tone et al. |
| 2011/0307623 | A1 | 12/2011 | George et al. |
| 2012/0057459 | A1 | 3/2012 | den Hartog et al. |
| 2012/0059826 | A1 | 3/2012 | Mate et al. |
| 2012/0072938 | A1 | 3/2012 | Seong et al. |
| 2012/0096089 | A1 | 4/2012 | Barash et al. |
| 2012/0192242 | A1* | 7/2012 | Kellerer .................. G06F 16/78 725/116 |
| 2012/0198497 | A1 | 8/2012 | Chan |
| 2012/0222058 | A1 | 8/2012 | el Kaliouby |
| 2012/0233000 | A1 | 9/2012 | Fisher et al. |
| 2012/0265573 | A1 | 10/2012 | Van Pelt et al. |
| 2012/0275377 | A1 | 11/2012 | Leanne et al. |
| 2012/0278428 | A1 | 11/2012 | Harrison et al. |
| 2012/0284090 | A1 | 11/2012 | Marins et al. |
| 2012/0284145 | A1 | 11/2012 | Kalin et al. |
| 2012/0300046 | A1 | 11/2012 | Blayvas |
| 2013/0019187 | A1 | 1/2013 | Hind |
| 2013/0040660 | A1 | 2/2013 | Fisher et al. |
| 2013/0079142 | A1 | 3/2013 | Krugick |
| 2013/0086170 | A1 | 4/2013 | Skelton et al. |
| 2013/0120587 | A1 | 5/2013 | Gu et al. |
| 2013/0124496 | A1 | 5/2013 | Edgar et al. |

FOREIGN PATENT DOCUMENTS

| | | |
|---|---|---|
| EP | 2398231 | 12/2011 |
| EP | 2402894 | 4/2012 |
| JP | 10-2005-0052859 | 6/2005 |
| JP | 2012004768 | 1/2012 |
| KR | 1020050052859 A | 6/2005 |
| KR | 1020100069139 | 6/2010 |
| WO | 2008/017249 | 2/2008 |
| WO | 2011 /004381 | 1/2011 |
| WO | 2012/054048 | 4/2012 |
| WO | 2012/ 122269 | 9/2013 |

OTHER PUBLICATIONS

"CrowdOptic Augmented Reality and Analytics Platform", CrowdOptic, 2013, www.crowdoptic.com.
Eagle, N., "Reality Mining", MIT Media Lab, 2009, http://reality.media.mil.edu/datasel.php, screen capture Jun. 5, 2012.
Green, K., "TR10: Reality Mining", Technology Review, Mar./Apr. 2008, http://www.technologyreview.com/printer_friendly_article.aspx?id=20247, screen capture Jun. 5, 2012.
O'Hear, S., "Calling All iPhoneographers—Foap Wants to Get You Paid", TechCrunch, Jun. 27, 2012, http:// techcrunch .com/2012/06/ 27 /calling-all-iphoneographers-foap-wants-to-get-you-paid.
Perez, S., "Google Adds 20 Museums to Indoor Google Maps, Says More on the Way", Tech Crunch, Jul. 10, 2012, http :/lm. tech crunch. com/2012/07/1 O/google-adds-20-museums-to-indoor-google-maps-says-more-on-the-way/.
Spingram-Koff, J., "CrownCam: crowdsourced mobile video stream for journalistic applications", Mozilla Drumbeat, May 2011, https:// drumbeal.org/en-US/challenges/unlocking-video/submission/61/.

* cited by examiner

CONTENT RESTRICTION IN VIDEO CONTENT SHARING COMMUNITY

This application is a divisional of U.S. patent application Ser. No. 14/020,556, which is a continuation-in-part of U.S. patent application Ser. No. 13/912,567, filed on Jun. 7, 2013, which claims priority to the following U.S. provisional applications 61/676,426, 61/676,431, 61/676,436, 61/676,443, and 61/676,452 filed Jul. 27, 2012; 61/675,268, 61/675,263, 61/675,258, and 61/675,271 filed Jul. 24, 2012; and 61/656,619 filed Jun. 7, 2012. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is data collection and management technologies.

BACKGROUND

The background description includes information that may be useful in understanding the present invention. It is not an admission that any of the information provided herein is prior art or relevant to the presently claimed invention, or that any publication specifically or implicitly referenced is prior art.

With the pervasive use of cell phones capable of capturing or presenting content, there has been an ever growing demand for technologies that allow users to participate in, or even create, augmented experiences.

Some efforts have been put forth in capitalizing on the above demand. For example, U.S. Patent Application Publication Number 2012/0192242 to Kellerer titled "Method and Evaluation Server For Evaluating a Plurality of Videos," filed on Jan. 20, 2012 describes a system that identifies a set of videos capturing the same event from a plurality of videos, and prioritizes the videos based on a limited number of factors such as video characteristics and viewing angles. Unfortunately, Kellerer apparently fails to take into account various factors that may be of interest in customizing a presentation for a user, and apparently fails to present the videos in a manner that optimizes viewing or customization capabilities of a user.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As another example, U.S. Pat. No. 8,250,616 to Davis titled "Distributed Live Multimedia Capture, Feedback Mechanism, and Network," filed on Sep. 28, 2007 describes presenting a set of videos in real-time, wherein the videos can be organized based on presentation or ranking criteria (e.g., popularity of event, popularity of broadcaster, length of coverage). U.S. Pat. No. 7,657,920 to Arseneau titled "System and Methods For Enhancing The Experience of Spectators Attending a Live Sporting Event With Gaming Capability," filed on Jul. 21, 2006 describes a system generally directed towards presentation of sports videos in which thumbnails representing videos can be presented to a user for selection. Upon a user selection, Arseneau's system can display physiological data associated with an athlete in the video.

Further examples can be found in: U.S. Patent Application Publication Number 2009/0063419 to Nurminen titled "Discovering Peer-to-peer Content Using Metadata Streams," filed on Aug. 31, 2007; Korean Patent Application Number 2010/0069139 to Cho titled "System and Method For Personalized Broadcast Based on Dynamic View Selection of Multiple Video Cameras, Storage Medium Storing The Same," filed on Dec. 15, 2008; U.S. Pat. No. 8,286,218 to Pizzurro titled "Systems and Methods of Customized Television Programming Over The Internet," filed on Dec. 13, 2007; Canadian Patent No. 2,425,739 to Freeman titled "A Digital Interactive System For Providing Full Interactivity With Live Programming Events," filed on May 15, 2003; U.S. Pat. No. 6,122,660 to Baransky titled "Method For Distributing Digital TV Signal and Selection of Content," filed on Feb. 22, 1999; U.S. Patent Publication Numbers 2011/0117934 and 2012/0059826 to Mate titled "Method and Apparatus For Mobile Assisted Event Detection And Area of Interest Determination," and "Method and Apparatus For Video Synthesis," respectively, and filed on Nov. 15, 2009 and Jan. 24, 2011, respectively; and U.S. Patent Publication Number 2012/0233000 to Fisher titled "Systems and Methods For Analytic Data Gathering From Image Providers At An Event Or Geographic Location, filed on Mar. 7, 2012.

Unfortunately, previous known efforts have not been directed towards simultaneous presentation of multiple video streams in a manner that optimizes a user's viewing experience or allows a user to request targeted modifications based on the information presented. Applicant has come to appreciate that presenting multiple feeds in a clustered arrangement aids in enhancing a user's experience.

Thus there is a need for improved data collection and presentation management technologies.

SUMMARY OF THE INVENTION

The inventive subject matter provides apparatus, systems and methods in which one can leverage a remote experience interface system to access one or more experience feeds related to an event. Such systems and methods can advantageously allow a person to experience an event from various perspectives that he or she may otherwise not be privy to.

One aspect of the inventive subject matter includes a system comprising a feed aggregation engine coupled to one or more feed acquiring devices. The feed aggregation engine can be configured to obtain a plurality of feeds from the feed acquiring devices and construct an experience feed based on an experience policy. In some preferred embodiments, the aggregated feeds could be related to a single event or venue (e.g., game, concert, exhibit, etc.).

An experience policy can include various terms that dictate how an experience feed is to be constructed. These terms can be based on any suitable data, including for example, rules data, instructions data, cost data, fee data, subscription data, bid data, or various other categories of data. The experience policy can be established automatically, by viewers, by broadcasters, by a system manager, or by any other suitable techniques. Once the experience policy is established automatically or otherwise, the feed aggregation engine constructs the experience feed according to the terms of the experience policy and the acquired feeds. The feed aggregation engine can then provide the experience feed to one or more output devices, and can instruct the output devices to present the experience feed to one or more users where the arrangement of feeds includes a cluster indicator. The output device can include computers, printers, tablets, kiosks, cell phones, or any other commercially suitable types of computing devices.

In another aspect of the inventive subject matter, the experience feed can be dynamic in nature, or be presented to a viewer in a manner that allows the viewer to modify or customize the experience policy or the experience feed based on the viewer's preferences.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
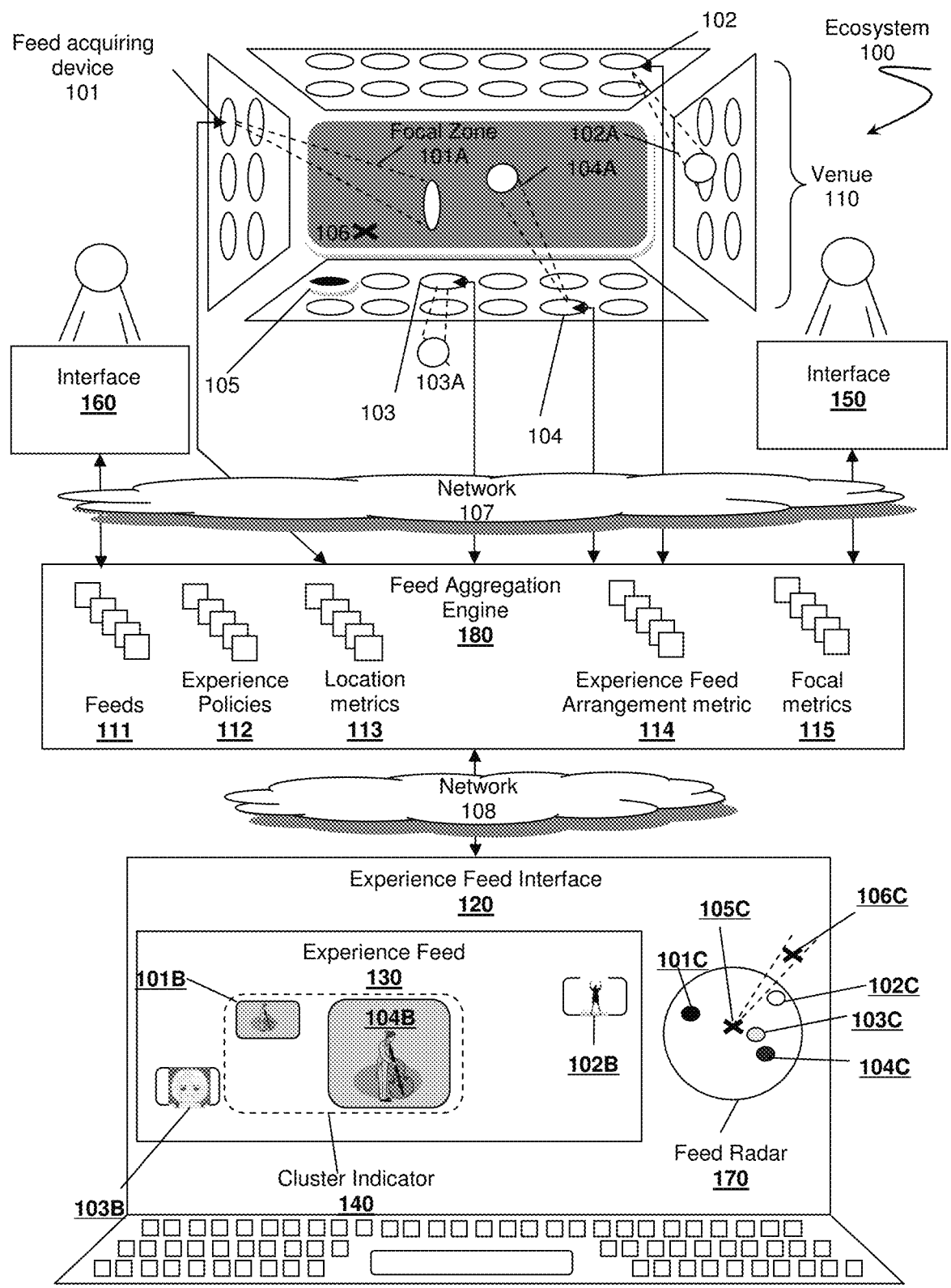
FIG. 1 is a schematic of a remote experience ecosystem.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the disclosed techniques provide many advantageous technical effects including configuring devices to present one or more user interfaces allowing users to manipulate or manage a remote experience.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

One should appreciate that the disclosed systems and methods allow users to remotely obtain a customized experience feed related to an event based on multiple dimensions of relevance. The experience feed can include a plurality of video feeds that are aggregated and presented in a manner that provides an optimal viewing experience for a user or group of users. One should also appreciate that the disclosed system and methods allow users to virtually and seamlessly navigate through, or obtain a virtual view from, selected areas within an arena or other geographic location without having to weave through crowds, pay for additional tickets, or even leave their house.

Example scenarios that can benefit from such technology include, among other things, concerts, plays, museums, exhibits, tourism, ticket vendors, movie theatres, social networking, location scouting, fashion shows, or other scenarios.

In FIG. 1, ecosystem 100 illustrates a remote experience interface system. Contemplated systems include an experience feed interface 120 coupled to a plurality of feed acquiring devices 101, 102, 103, 104 via a feed aggregation engine 180. The plurality of feeds can be sent or otherwise transmitted from sensing devices 101, 102, 103, 104 over a network 107 (e.g., Internet, cellular network, LAN, VPN, WAN, parts of a personal area network, etc.) to feed aggregation engine 180 that is preferably configured or programmed to aggregate the plurality of feeds 111 into one or more experience feeds 130 according to an experience policy 112, and possibly other metrics, dimensions, terms, or other factors. Experience feed 130 can then be transmitted to one or more devices (e.g., computers, tablets, game consoles, game handhelds, cell phones, appliances, vehicles, etc.) over a network 108 for presentation via an interface e.g., 120.

One should appreciate that the disclosed technology can allow a user to virtually experience an event 110 that he would otherwise not have access to through reception of video feeds obtained from devices located in proximity to the event. It is contemplated that experience feed 130 can be constructed from not only video feeds, but additionally or alternatively from original or modified audio data, image data, textual data, time data, location data, orientation data, position data, acceleration data, movement data, temperature data, metadata, user data, or any other suitable sensor data acquired by feed acquiring devices 101, 102, 103, 104 having one or more corresponding sensors (e.g., a mechanical sensor, a biometric sensor, a chemical sensor, a weather sensor, a radar, an infrared sensor, an image sensor, a video sensor, an audio sensor, or any other commercially suitable sensor that can construct or acquire sensor data). Contemplated feed acquiring devices can include, among other things, a mobile phone, a smart phone, a camera, a tablet, a video camera, virtual reality glasses, a security camera, a computer, a laptop, or any other suitable feed acquiring device.

Individuals or entities controlling feed acquiring devices 101, 102, 103, 104 can be considered broadcasters of an event 110. The event broadcasters can utilize feed acquiring devices to acquire video or other sensor data related to one or more focal zones 101A, 102A, 103A, 104A of an event 110. Once the various feeds of video or other data are aggregated by feed aggregation engine 180, the feeds can be modified or curated for presentation in experience feed 130 according to an experience policy 112.

An experience policy 112 related to an event 110 preferably includes event attributes, commands, and other terms that can dictate how an experience feed is to be constructed. It is contemplated that an experience policy 112 can be generated by one or more persons or entities, including for example, a viewer, a system or event manager, a broadcaster, or a conflicts manager. Where multiple persons or entities contribute to generation of an experience policy, it is contemplated that data relating some or all of the terms (e.g., rules, commands, costs, fees, subscriptions, bids, etc.) can be transmitted via one or more interfaces 160, 170 to a policy generation module (not shown) for generation of an experience policy.

One should appreciate that the aggregated feeds 111 or experience policies 112 can be utilized to derive one or more experience dimensions of relevance that can provide a description of data contained therein. The experience dimensions can be derived based on the context (e.g., data acquired in feeds 111 suggests that some feeds include loud audio while others only contain video, etc.), or can be derived based on a known input received by a policy generator. As one example of a known input, an experience policy may include a user input term suggesting a preference for a front row view of a lead singer of a band. Such term can be used to derive, among other things, a location dimension or a focal dimension.

Other contemplated experience dimensions include for example a time dimension, a point of view dimension, a capacity dimension, a relevancy dimension, a proximity dimension, a relationship dimension, a rating dimension, an emotional dimension, a sensory modality dimension, a color dimension, a volume dimension, or any other suitable category of data that may be of relevance in generating an experience feed 130.

The experience dimensions, aggregated feeds or experience policies can then be used to generate or calculate one or more metrics associated with an experience dimension, which can provide a value associated with the dimension. Contemplated metrics include for example, a location metric 113 (e.g., GPS coordinate value; physical address; zip code; a centroid of devices, friends, celebrity or venue; etc.), a focal metric 115 (e.g., coordinates associated with a central point of view, a tilt, a rotation, an angle, etc.), a time metric (e.g., a time of day, a length of feed, an estimated time of arrival or start, etc.), a capacity metric (e.g., a venue capacity value, a percent to capacity value, etc.), an experience feed arrangement metric 114 (e.g., primary feed location, primary feed size, etc.), a relationship metric (e.g., a distance between broadcasters, a ranking of the most popular videos, etc.), a relevancy metric (e.g., a percentage of user preferences met by a video feed, etc.), a proximity metric (e.g., a distance to a focal zone, a distance to a person, etc.), an emotion metric (e.g., a number of smiling people, a percentage of smiling people, a color, a brightness, etc.), or any other suitable metric. One should appreciate that multiple values or types of values can be associated with a single dimension, and that a single value can be a metric of one, two, or event five or more dimensions.

In some preferred embodiments, feed aggregation engine 180 can be configured to construct an experience feed 130 having an arrangement of a primary feed and a plurality of peripheral feeds according to an experience policy 112. Experience feed 130 can also be constructed having an arrangement of feeds based on one or more metrics 113, 114, 115. For example, a preferred location 105 and a preferred focal point 106 can be input by a user, broadcaster or manager and used to generate a location metric and focal metric in constructing experience feed 130.

In the example provided, experience feed 130 is presented with a primary feed 104B and peripheral feeds 101B, 102B, 103C having an arrangement according to at least one of the experience policy 112, location metric 113, and focal metric 115. In especially preferred embodiments, a "primary feed" can comprise one or more feeds that best match the totality of terms included in experience policy 112 and metrics 113, 114, and 115. In FIG. 1, primary feed 104B is captured by feed acquiring device 104, and is the stream that best matches a combination of the location metric 113 generated based on preferred location 105, and focal metric 115 generated based on preferred focal point 106. Feed 103B is captured by feed acquiring device 103 and provides the best match for location metric 113. However, feed 103B could be considered peripheral because it provides a weak match for focal metric 115. Similarly, feed 101B could be peripheral despite providing a closer match to focal metric 115 because feed 101B provides a weak match to location metric 101.

Experience feed 130 can also advantageously include a cluster indicator 140 generated as a function of a focal metric 115. Cluster indicator 140 can comprise a visual or non-visual indicator of the feeds that provide an indication of a match (e.g., best, worst, etc.) to focal metric 115 or any other dimension or metric. In the example shown, focal cluster is a visual box surrounding feeds 101B and 104B whose focal zones 101A and 104A best match preferred focal point 106. However, other possible visual indicators include a color, an image, a video, a symbol, a text, a number, a highlight, a change in size, or any other suitable visual indicator. Possible non-visual indicators include a sound, a voice, a signal, a smell, or any other suitable non-visual indicator. It is also contemplated that cluster indicator 140 can be generated as a function or two, three or even four or more dimensions, metrics or terms. Furthermore, cluster indicators can be provided generated as a function of one or more non-focal dimensions or metrics (e.g., a time cluster shown as a clock can be generated as a function of a time metric, a location cluster shown in a red block can be generated as a function of a time metric and a direction of view metric, etc.).

One should appreciate that cluster indicators can be used in relation to an event for various purposes. These purposes can include, among other things, social networking, discovering new people or topics of interest, finding a person of interest, making a purchase, obtaining a recommendation, improving education, targeted marketing or advertising, improving telepresence, achieving business goals, or any other suitable purpose that furthers a goal or interest of a viewer, event manager, broadcaster, or advertisers.

While many of the examples hereinafter focus on providing cluster indicators to viewers, the following possible use case illustrates how cluster indicators can be provided to an event manager or advertiser to assist in determining what targeted marketing material to present to viewers. Perry Farrell, the creator of Lollapalooza® could provide remote experiences to viewers who cannot attend the music festival in person. Stone Temple Pilots® (STP), a band performing at Lollapalooza, wishes to advertise its new album to remote viewers who may be interested in pre-purchasing the album. There could be three stages at the festival, and each stage could have scheduled performance at all times during the three-day festival. In order to provide targeted advertisement opportunities to STP, Perry could obtain an experience feed that provides an indication of broadcasters that are capturing feeds of STP's performance or stage (pre-performance), and include STP's advertisement in those feeds. When a viewer selects those broadcaster's feeds during STP's performance, they could view the pre-sale advertisement for STP's new album and possibly be provided with a link to make a purchase.

It is also contemplated that feed radar 170 can be presented to a user to provide a simple or consolidated presentation of feed data. Feed radar 170 can show a relative location of peripheral feeds in relation to a primary feed. Feed radar 170 can also advantageously present an indication of other information related to the feeds, for example, a focal zone, a direction of view with respect to the focal zone, a time, a quality, a capacity, a capability, a volume, or a compliance with a set of terms. In the example provided, radar 170 provides an indication of where each feed acquiring device is located relevant to a preferred location (e.g., 105). Radar 170 also provides an indication of how closely the devices' focal zone matches a focal preference (e.g., 106). In this example, the indication is provided through the variation in shading of circles representing the devices. Other suitable indications include a difference is sizing, color or symbol; a boxed portion; an image; text; or any other suitable indications.

Figure 2:
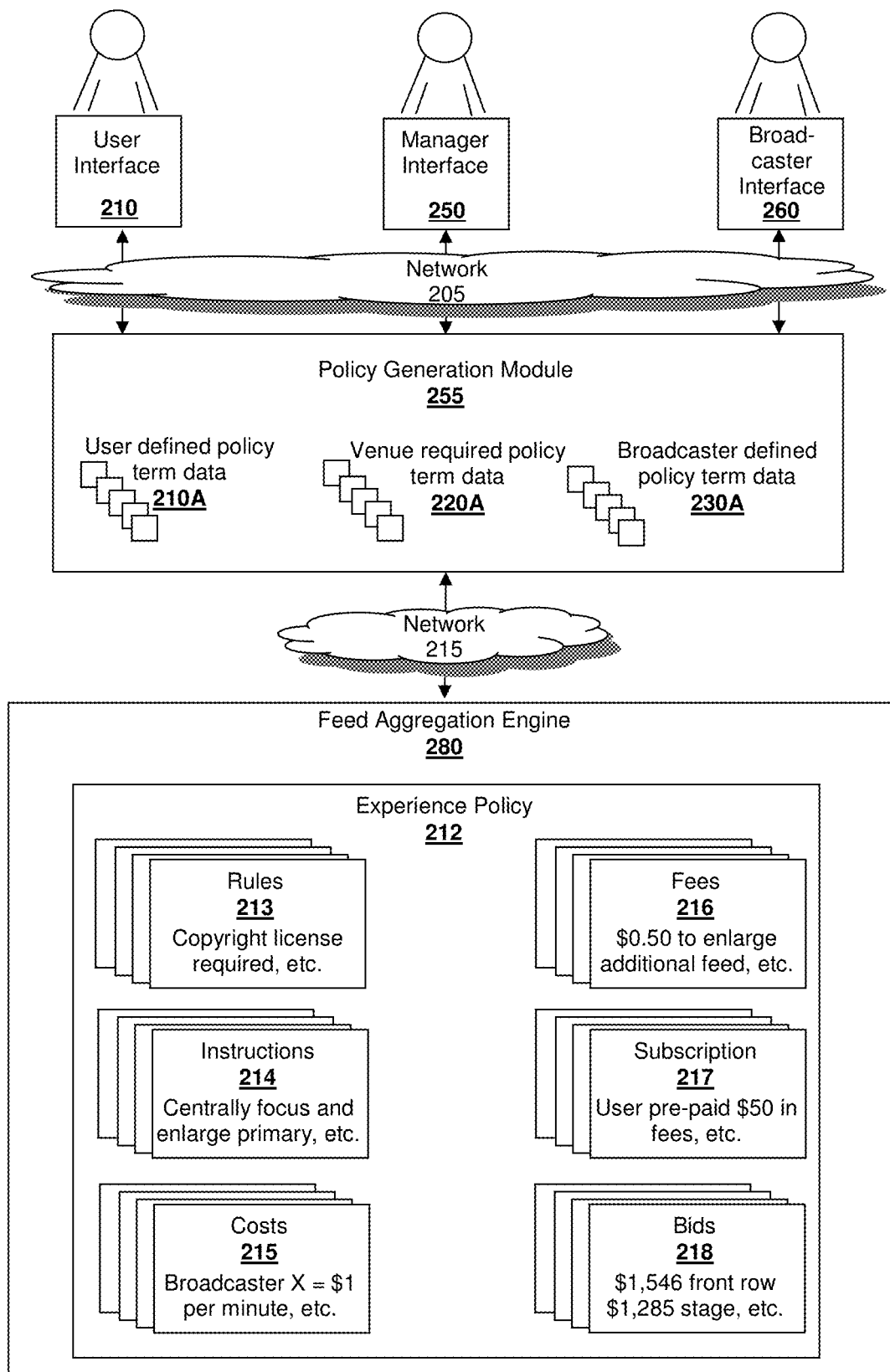
FIG. 2 is a schematic showing generation of an experience policy.

FIG. 2 illustrates a policy generation module 255, which obtains inputs and generates experience policy 212. As discussed above, experience policy 212 can be related to an event and include event term data that dictates how an experience feed is to be constructed. Term data can be represented in a memory coupled to a central processing unit of a computing device, and can include rule data, instruction data, cost data, fee data, subscription data, rights data, bid data, command data or any other suitable types of data that may be obtained by policy generation module 255 in relation to an event. It is contemplated that experience policy 212 terms can be used to generate instructions (e.g., scripts, compiled code, executable instructions, etc.) useful in constructing an experience feed to be presented to a user. It is also contemplated that the experience policy 212 itself can comprise instructions derived or generated based on some or all of the term data, which can be carried out, run or executed by a computer or a virtual machine in presenting an experience feed to a user.

In some preferred embodiments, an experience policy 212 is generated by policy generation module 255 via input of at least one of a user, an event manager, a system manager, a broadcaster, an advertiser, or other person or entity having an interest in an arrangement of an experience feed. In the example shown a user can provide input via user interface 210, a manager can provide input via manager interface 250 and one or more broadcasters can provide inputs via broadcaster interface 260. Each of the interfaces 210, 250 and 260 can be communicatively coupled over network 205 to policy generation module 255, which is configured to generate an experience policy 212 in accordance with some or all of the term data.

As used herein, an "interface" can comprise any boundary across which two independent systems can meet or communicate. Exemplary interfaces comprise, among other things, a web browser, a keyboard, application software, an application suite, an application program interface (API), a touchscreen, a mouse, a graphical user interface (GUI), a web user interface (WUI), or any other suitable boundary. It is contemplated that persons or entities can provide inputs via an interface in any suitable manner, including for example, by a selection among a plurality of options, by a gesture, by a drag-n-drop mechanism, by a keyboard, by a mouse click, by voice command, by a gesture, or any other suitable manner. One should also appreciate that one or more of the interfaces (e.g., user interface, etc.) can comprise an experience feed interface configured to present an experience feed constructed according to experience policy 212, or can comprise a separate interface.

All suitable types of input can be provided to policy generation module 255 via an interface, including for example, rule data, instruction data, preference data, emotion data, desired indicator data, subscription data, bid data, cost data, fee data, ranking data, or any other suitable input. This input can be manually input by the input provider, can be automatically obtained via one or more sensors of interface 250 (e.g., biometric sensor, GPS sensor, accelerometer, camera, audio sensor, thermometer, microphone, breathalyzer, a smoke detector, a rain sensor, a gyroscope, etc.), or can be derived from data obtained automatically or as an input.

In the example provided, data obtained from a user or user interface is referred to as user defined policy term data 210A. It should be appreciated that any suitable type of inputs can be provided by a user, which can include preference data (e.g., a location preference, focal zone preference, sound quality preference, etc.), ranking data (e.g., an order of importance of experience feed characteristics, etc.), account data (e.g., a balance, a subscription, user name, password, pending charges, authorized charges, etc.), rule data (e.g., indemnification by a broadcaster or manager against copyright infringement, etc.), or any other suitable types of input.

In the example provided, data obtained from a manager or manager interface is referred to as venue required policy term data 220A. It should be appreciated that any suitable type of inputs can be provided by a system or event manager, which can include capacity data (e.g., a broadcaster capacity, a camera capacity, a person capacity, a viewer capacity, an area capacity, etc.), rule data (e.g., prohibited activity, broadcaster requirements, viewer requirements, etc.), command data (e.g., how a primary feed is to be presented, number of feeds presented, type of cluster indicator, interface components to be provided to a user (e.g., selector, volume adjuster, touch-screen capability, time-shifting buttons, etc.), etc.), cost data (e.g., amount a broadcaster is being paid, account management, etc.), fee data (e.g., amount to charge viewer for actions, amount to charge broadcaster for recording permit, etc.), or any other suitable types of input.

In the example provided, data obtained from a broadcaster or a broadcaster interface is referred to as broadcaster defined policy term data 230A. It should be appreciated that any suitable type of inputs can be provided by a broadcaster of an event, which can include rules data, instruction data, cost data, bid data (e.g., amount required to begin streaming, amount required for a location within a venue, amount required for a type of camera used, etc.), permit data (e.g., types of clearances obtained, etc.), or any other suitable types of inputs.

One should appreciate that any term data obtained from any persons or entities can be used in at least one of: deriving a dimension of relevance; generating a metric associated with one or more of the derived dimensions; and generating clusters associated with a dimension or metric (e.g., location cluster, cost cluster, location cluster, bid cluster, fee cluster, ranking cluster, etc.).

It is contemplated that each term data 210A, 220A, 230A of policy generation module 255 can be included in experience policy 212 as a rule, an instruction, a cost, or other term. More preferably, a combination of policy generation module term data 210A, 220A or 230A can be used to derive or generate a term of experience policy 212. As used herein, a "term" can comprise any rule, command, cost, fee, subscription, bid, an instruction derived or generated from one or more of the aforementioned for execution in presenting an experience feed to a user, or any other suitable term that can be generated as a function of term data obtained by policy generation module 255, and suitable for use in constructing an experience feed.

The following use case provides an example of how input from various persons or entities can be used to generate an experience policy having various terms. Tomas's favorite band Pearl Jam is playing a show at the House of Blues® (HOB®) on Sunset Boulevard, but Tomas is in Brazil and unable to attend the show. Using his mobile computing device, Tomas connects to policy generation module 255 and communicates that he wishes to view the Pearl Jam HOB show from front row center, with a focal zone covering the entire band, a front-facing direction of view, and superior sound quality. The communication of his front row center preference can be accomplished via his prior inputs in relation to five other experience feeds he viewed in the last two months, all of which requested a front row center view. The communication of his focal zone preference can be accomplished via a selection made through his mobile computing device, which can present a plurality of focal zones to select from or rank. The communication of his superior sound quality preference can be accomplished via a voice command obtained via an audio sensor of his mobile computing device, or be a default input for all events viewed through Tomas's account.

In addition to Tomas's inputs, policy generation module 255 can obtain various event manager inputs via manager interface 250. These inputs can include, among other things, a twenty-five broadcaster capacity for the event, a five broadcaster capacity for the front row of the event, a rule allowing cameras inside the venue, and a limitation on flash photography. Still further, policy generation module 255 can obtain various broadcaster inputs via broadcaster interface 260. These inputs can include inputs from various broadcasters available for an event, and can include a fee, a venue location, a focal zone, a data type, a direction of view, an assignment, and a copyright ownership notice.

As discussed above, one or more terms obtained by policy generation module 255 can become a term of experience policy 212, or used to derive a term of experience policy 212. For example, and continuing on the use case above, the front row preference of the user, locations provided by broadcasters, and the front row capacity information can be used to generate rule 213 requiring that only feeds from the five broadcasters located in the front row are included in Tomas's experience feed. As another example, the fee input provided by a broadcaster via interface 260 can become cost 215 or fee 216.

While the above example focuses on generating experience policies via one or more inputs, it should be appreciated that an experience policy 212 can be generated using known data (e.g., previously input data, rule of law, etc.), including a right of publicity law, a venue requirement, a user preference, a user default, a broadcaster default, stage location data, or any other data included in a previously generated experience policy. It should also be appreciated that a system of the inventive subject matter can be configured to identify potential applicability of a rule, notify a system manager or other user of the potential applicability, and provide an appropriate resolution or recommendation. For example, where an event comprises a music festival that plans to use holographic images of a deceased celebrity, rule 213 can be related to the celebrity's right of publicity (e.g., the right to control its name, image, personal, etc.). The system can be configured to identify a potential right of publicity issue in the state of California based on the data obtained by policy generation module 255 (e.g., the celebrity's domicile in California at the time of death, etc.) and notify the event manager of a potential issue. The system can also recommend a possible resolution or recommendation derived from the law, including for example, a recommendation that the event manager obtain clearance for the use from the deceased celebrity's estate. As other examples, the system can be configured to identify a potential copyright infringement based on a lack of copyright clearance input, or a need for an assignment or work for hire agreement from a broadcaster based on inputs indicating previous user or system manager complaints.

As with any system that allows multiple inputs, especially where the inputs can be provided by multiple persons or entities, it is contemplated that a conflict may arise among two or more inputs. Such conflicts can arise between inputs of a single person or entity, inputs of multiple persons or entities, an input and known data, or any other information obtained by policy generation module. In such scenarios, it is contemplated that any suitable conflict resolution means can be utilized to determine what term(s) to generate, derive or apply. The conflict resolution means can comprise, among other things, a conflict resolution engine that can resolve conflicts based on one or more of a timing of an input; a ranking; a loyalty of a user, manager or broadcaster; a preference of a user, manager or broadcaster; or any other suitable basis. The conflict resolution engine can act automatically based on a set of pre-defined rules, or can require input from a conflict resolution manager familiar with rules for resolving a conflict. For example, where a broadcaster provides a policy term requiring a cost of $0.25 per copy of a video feed, and a system manager provides a policy term requiring a payout of $0.10 to the broadcaster per copy of a video feed, a conflict resolution engine can automatically resolve the conflict by identifying a default term, for example, based on a prior agreement between the system manager and broadcaster agreeing to a payment of $0.15 per copy. As another example, it is contemplated that a broadcaster can provide bid requirements that differ from a system manager. The broadcaster may provide an input requiring a total bid amount of $1,000 and a minimum bid of $0.10 per viewer (i.e., bids of varying amounts). A system manager may provide an input requiring that all bids are the same amount (e.g., each viewer must bid $0.50, and there must be at least 2,000 bidders). The conflict resolution manager can resolve the conflict by determining how flexible a broadcaster has been in previous auctions and determining whether applying the system manager's rule would alienate the broadcaster.

Upon generation of experience policy 212, it can be transmitted over network 215 to feed aggregation engine 280, which is configured to construct an experience feed having an arrangement of feeds according to the experience policy 212. The feed aggregation engine 280 can construct the experience policy by executing instructions either included in experience policy 212, or generated based on terms in experience policy 212. Experience policy 212 can comprise any suitable number of terms: including rules, commands, instructions, costs, fees, subscriptions, bids, rankings (e.g., of broadcasters, users, subscribers, etc.), defaults, or any other suitable terms that can be useful in constructing an experience feed.

As used herein, a "rule" can comprise a term of an experience policy that comprises a regulation or principle regarding one or more elements of an experience feed that either must be followed, or is preferably to be followed. Examples include, among other things, a copyright law, a right of publicity law, a license requirement, a copyright notification requirement, a trademark notification requirement, a disclaimer requirement, an assignment requirement, or any other suitable rule set by an event manager, performer, broadcaster, user, court, legislative body, agency or other person or entity.

As used herein, a "cost" can comprise a term of an experience policy that includes a cost associated with providing a particular feed in an experience feed. As examples, a cost can comprise a cost to a user to obtain a particular feed (e.g., $1.00 to obtain a feed meeting at least 90% of a user's preferences, etc.), or can comprise a cost to a system manager for each provision of a particular feed (e.g., $0.20 to be paid to the broadcaster each time the broadcaster's video is included).

As used herein, a "fee" can comprise a term of an experience policy that includes a fee to be charged to a user upon an action, including for example, a zoom, a save, a time-shift, having more than one primary feed, a viewing in a public venue (e.g., a restaurant, bar, café, pool hall, etc.), or any other action by a user with respect to an experience feed.

As used herein, a "subscription" can comprise data related to one or more users, including a user name, a password, account information, a credit history, a payment received by a user, a balance, or any other suitable data that indicates the type of experience feed to provide to a user, or an action allowable by a user.

As used herein, a "bid" can comprise data related to a pricing of a wish-list feed available via a crowd-based bidding platform (e.g., a virtual auction or bartering platform, etc.). The pricing can be related to a price that a broadcaster requires in order to begin capturing or providing a feed, or can comprise a price that one or more users are willing to pay, or have pre-paid, in order to obtain a feed. As evident in the following use case, a crowd-based bidding platform can allow users and broadcasters to dictate the types of feeds that are to be made available in relation to an event. Broadcaster X is required to pay $1,000 to the UFC® organization if he wishes to capture video of the next Anderson Silva fight. Broadcaster X is available for the event, but is only willing to participate as a broadcaster if he can obtain $10,000 in user fees. Broadcaster X utilizes the bidding platform provided by the inventive subject matter to open bidding to sports bar owners across the country. It is contemplated that the types and amounts of bids accepted by Broadcaster X can be customized in any suitable manner by a person or entity accepting bids. Here, Broadcaster X can customize the bidding platform to, among other things, accept bids only over a minimum amount, require a premium amount for obtaining access to Anderson Silva's pre-fight interview, require a premium amount for capturing celebrities attending the fight, accept non-cash bids, or allow bidders to vote to select Broadcaster X's location, focal zone, direction of view or other feed capturing characteristic.

One should appreciate that the dissemination of bids through a system of the inventive subject matter can be observed, studied or managed by a system manager or broadcaster. This data can be used to determine what events, broadcasters or feed characteristics are in demand by a user or groups of users in order to make profitable business decisions. For example, a broadcaster can use the bidding data to determine the type of requests that are popular in a specific context. Based on the data the broadcaster can, among other things, purchase a specific seat in a venue for acquiring feeds, utilize a specific device, modify settings of the device, or determine a type of emotion to capture or evoke.

As used herein, a "command" can comprise a term of an experience policy that initiates an operation defined by an instruction (defined below). Examples of commands can include, among other things, a command to centrally focus a primary feed; enlarge a primary feed; arrange peripheral feeds into a cluster based on focus, location, time, quality, etc.; include a mauve, pink, blue, black, gold, red, or other background color; allow a zoom, pause, rewind, fast-forward, etc.; require a fee for a selection, a zoom, a recording, an increase in number of primary feeds, etc.; or any other suitable command. At least one corresponding instruction can be included as a term to dictate how the operation initiated by the command is to be achieved.

As used herein, an "instruction" can comprise a term generated or derived from one or more terms of an experience policy, which can be provided as executable code, scripts or other suitable format for execution, running or carrying out by a computer or virtual machine. These instructions can, when executed, construct components of an experience feed that is customized according to at least some of the inputs obtained by a policy generation engine. For example, executable code can be provided as an instruction to arrange peripheral feeds (e.g., left to right, front to back, largest to smallest, etc.) based on a relationship dimension (e.g., highest to lowest number of the viewer's friends or relatives found in each feed, etc.) or other dimension. The instruction could be based on a user term showing a preference for such feeds.

One should appreciate that any term of an experience policy can influence not only an arrangement of feeds in an experience feed, but also what cluster indicator(s) are provided in the experience feed. As discussed above, cluster indicators can be used in relation to an event for various purposes. One should also appreciate that a cluster indicator can be dynamic in nature to advantageously provide a user with various indications throughout an event without requiring a user input during the event. A dynamic cluster indicator can allow a user to be simultaneously or sequentially presented with clusters that indicate different dimensions or metrics.

The following possible use case illustrates how a dynamic cluster indicator could be provided in accordance with terms of an experience policy. Daniel has a sprained ankle but wishes to make certain purchases for an upcoming trip to Hawaii. Daniel's friends Annie, Amanda, Andy and 16 others agree to go to the Grove® to provide Daniel with a remote shopping experience (i.e., act as broadcasters). Daniel connects to a policy generation engine over the internet and communicates that he would like an indication of the following sub-events: (1) who is at or next to his favorite store J Crew®; (2) who is viewing oxford shoes; (3) who is viewing a sale; and (4) who is near a celebrity. The policy generation engine could include instructions in a generated experience policy that, upon execution by a processor, generates a cluster indicator that is configured to change when one or more of the sub-events take place. For example, if one or more of Daniel's friends are viewing oxford shoes, the cluster indicator can provide an indication of such broadcasters (e.g., via a semi-transparent red box, etc.). If Daniel's friends are no longer viewing oxford shoes, but Annie walks by Rihanna, the cluster indicator can provide an indication that Annie is passing Rihanna (e.g., via a semi-transparent blue box, etc.). Where a cluster indicator indicates a sub-event that may be of interest to one or more of Daniel's friends, it is contemplated that Daniel can share the cluster information via a system of the inventive subject matter. For example, Daniel can communicate with an experience feed interface and cause the cluster information to be sent to his friends as an alert to a feed acquiring device, an alert to a broadcaster interface, or a message to a social networking site (e.g., Facebook®, Twitter®, etc.).

One should appreciate that two or more sub-events can occur at the same time. As such, a dynamic cluster indicator can sequentially provide indications of the sub-events (e.g., via a dotted box formed around the different clusters sequentially, etc.). Additionally or alternatively, two or more sub-events can be indicated simultaneously by one or more cluster indicators (e.g., via a box having two-tones to indicate two different sub-events, etc.).

Figure 3:
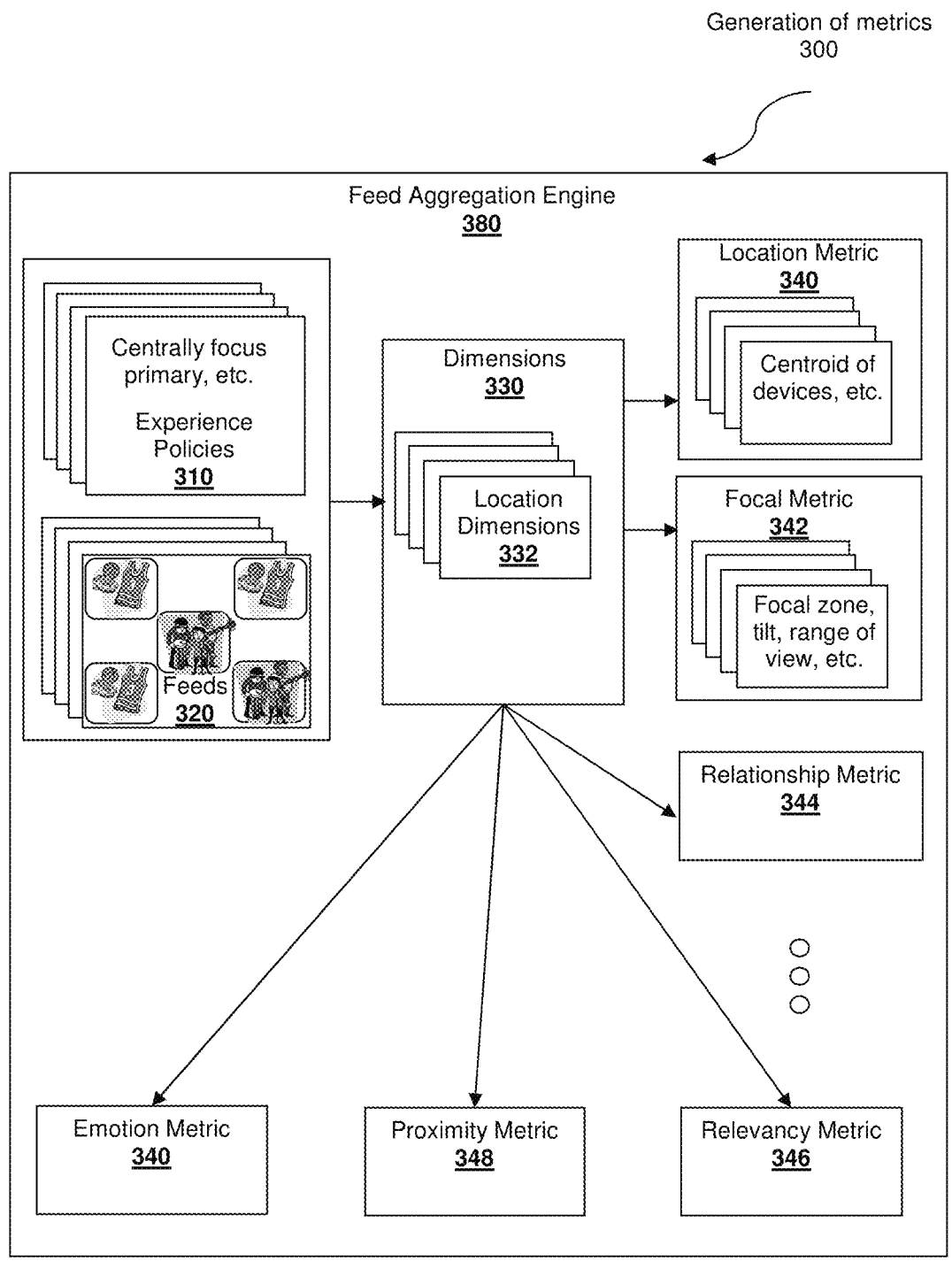
FIG. 3 is a schematic showing generation of a plurality of metrics based on experience policies and acquired feeds.

FIG. 3 illustrates metric generation 300 based on an experience policy and a plurality of feeds. As discussed above, the plurality of feeds 311 can be received by feed aggregation engine 380 from a plurality of feed capturing devices (See e.g., FIGS. 1, 101, 102, 103 and 104). The experience policies 310 can be received by feed aggregation engine 380 from a policy generation engine (See e.g., FIG. 2, 255). Also as discussed above, an experience policy 310 can comprise various terms that influence or dictate how an experience feed is constructed. As shown in FIG. 3, experience policy 310 can further be used to derive dimensions and generate metrics that can influence how an experience feed is constructed. As used herein, a "dimension" can comprise an aspect or feature of an event or feed, and a "metric" can comprise a measurement or value associated with a dimension. For example, a "location dimension" can indicate that location is an important characteristic to be considered in constructing an experience feed, while a "GPS coordinate" can indicate the type of location information available or of value.

In the example provided, feed aggregation engine 380 aggregates a plurality of feeds 320 from a plurality of feed acquiring devices (not shown), and obtains experience policies 310 associated with various viewers of an event (e.g., ten experience policies, wherein each experience policy is associated with a different viewer or viewers, etc.). While the experience policies 310 can advantageously comprise some of the same terms (e.g., from system managers, broadcasters, advertisers, etc.), the experience policies 310 can also comprise different terms based on inputs from a diverse group of viewers. It is contemplated that information obtained from one or more of the experience policies 310 can be used to generate dimensions 330, possibly utilizing data obtained or derived from feeds 320. The number of dimensions 330 derived can increase depending on the number of experience policies 310 considered, as additional experience policies can increase the number of terms from which dimensions 330 can be derived.

One should appreciate that for each dimension 330 (e.g., location dimension 332, etc.), one or more metrics (e.g., 340, 342, 344, 346, 348, 340, etc.) can be generated. For example, where a dimension comprises a time dimension, it is contemplated that the following metrics can be generated: a time of day (e.g., 2:00 PM, etc.), a length of feed (e.g., 45.3 seconds, etc.), an estimated time of arrival of a performer (7:13 PM, etc.), an estimated time of arrival of a broadcaster (2:00 PM, etc.), a start time 2.5 seconds, etc.), or any other suitable time metric. Some or all of the dimensions or metrics can have an influence on an arrangement of the feed. Because the number of dimensions derived can be increased via consideration of multiple experience policies associated with an event, the number of metrics generated with respect to each experience policy 310 can be increased to thereby provide an optimally customized experience feed to users. While it can generally be preferred that one or more values associated with each of the dimensions can be generated or calculated for each viewer or experience policy, it is contemplated that some experience policies 310 could lack a term that allows metric generation for one or more or the derived dimensions.

While the following use case provides some examples of dimensions and metrics that can be derived or generated by a system of the inventive subject matter, it should be appreciated that all suitable dimensions and metrics are contemplated, including those listed with respect to FIG. 1.

On New Year's Eve 2014, Martin, Nick and Bob are three of many viewers who have signed up to view the Times Square Ball drop via their respective computing devices in California. Each of the three experience policies generated for the three viewers can include some of the same terms generated based on broadcaster and manager inputs. These can include: location data indicating that broadcaster X is located in front of the event host's platform; focal zone data indicating that broadcaster Y's focal zone is to follow the Times Square Ball as it drops; and performance data indicating that Britney Spears is scheduled to perform on stage one at 8:00 PM eastern time, followed by the band Journey.

In addition, Martin's experience policy can include a user preference to provide the best view of the event's hosts from 9:00 PM—11:30 PM, and a best view of the Times Square Ball dropping from 11:30 PM to 12:30 PM. Nick's experience policy can also include a user specific term indicating a preference for uplifting footage, and a view of Journey's® performance. Bob's experience policy can further include a user specific term indicating a preference for the best view of the ball dropping at midnight, and a request to view the most popular feeds available at all other times. Furthermore, the various feeds acquired by the broadcasters can be characterized by certain attributes, including a clarity, a sound quality, a closeness to a focal point, a focal zone, and various other attributes.

Based on all of the aforementioned information available, the system can determine that the following dimensions, among others, are of relevance to one or more of the viewers: (1) a location dimension, (2) a focal dimension, and (3) a ranking dimension. The feed aggregation engine can use the derived dimensions and one or more of experience policies 310 to then generate metrics associated with each of Martin, Nick and Bob's respective experience policy for some or all of the three dimensions. For example, a location metric associated with the location dimension and Martin's experience policy can be generated including the location data of broadcaster X. As another example, a focal metric associated with the focal dimension and Nick's experience policy can be generated including a focal zone of broadcaster Y at 8:30 PM to 9:30 PM. As yet another example, a ranking metric associated with the ranking dimension and Bob's experience policy can be generated including a regularly updated top five list of popular videos.

These metrics can be used by a feed aggregation engine of the inventive subject matter in constructing experience feeds for one or more viewers of an event. For example, an instruction set that can be derived from the input of the various viewers, broadcasters and managers can include instructions in Martin's experience policy to include a cluster indicator in Martin's experience feed that indicates, in real-time, all feeds from feed acquiring devices whose focal zone includes the Times Square Ball. As another example, an instruction set that can be derived from the input can include instructions to include a cluster indicator in Nick's experience feed that indicates, in substantially real-time, all feeds from feed acquiring devices located near a stage, and capturing feeds of happy events (e.g., proposals, laughter, etc.) As yet another example, an instruction set that can be derived from the input can include instructions to include a cluster indicator in Bob's experience feed that provides an indication of all feeds from feed acquiring devices located near the host's stand that have at least 100,000 viewers.

Figure 4:
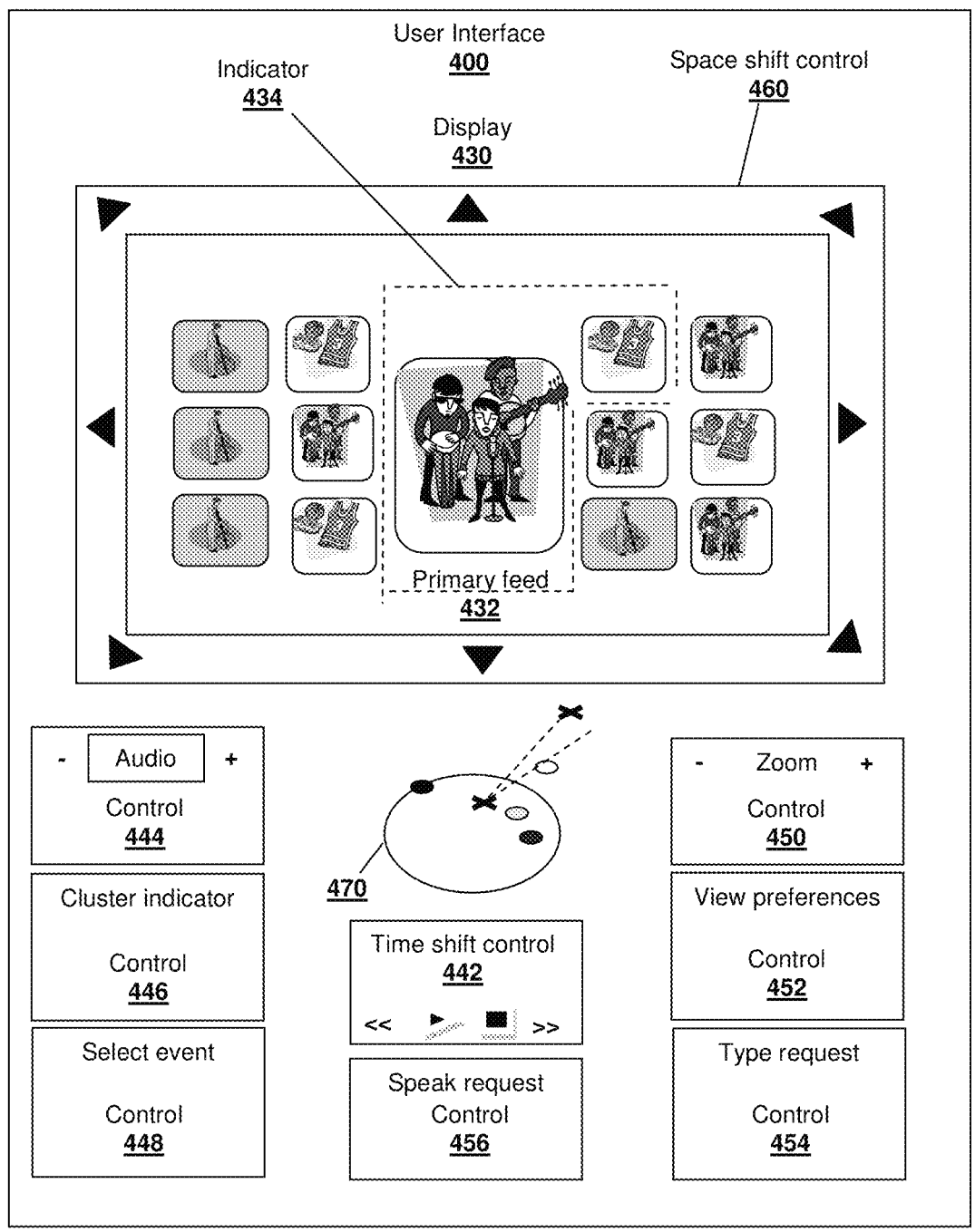
FIG. 4 is a schematic of a user interface including a plurality of feeds and controls.

FIG. 4 illustrates an experience feed interface 400 configured to present an experience feed having an arrangement of feeds according to an experience policy. Experience feed interface 400 is configured to allow a user to manipulate, observe, or otherwise manage a remote experience feed constructed from a plurality of aggregated data feeds. One should appreciate that an experience feed interface can also represent interfaces that can be leveraged by broadcasters, system managers, or other participants in an ecosystem.

User interface 400 comprises a display 430 presenting a plurality of feeds including a primary feed 432, and a feed radar 470 providing a consolidated or simplified representation of feed data as described with FIG. 1 above.

It is contemplated that an experience feed can include multiple experience levels (e.g., different angles, different focus, different time frame, different sound quality, etc.) and that a user may wish to modify one or more of the experience levels presented to him. As such, user interface 400 can further comprise various controls that allow a user to interact with a remote experience system of the inventive subject matter to further customize the experience feed presented to the user via interface 400.

In some embodiments, a plurality of feeds can be displayed in an arrangement mirroring the locations of feed acquiring devices in a venue. For example, display 430 can include feeds acquired from rows A-F of the Great Western Forum™ between seat numbers 121 and 151, and be presented as overlays in a 3D model of at least a portion of the Forum's seating area. If the user wishes to view feeds captured by devices located in different parts of the Forum, the user can simply utilize space shift control 460 (e.g., by pressing one or more arrows on the screen, pinching, expanding, voice command, etc.). Such a control can advantageously allow a user to virtually view a focal point of an event from a plurality of locations within a venue with little to no effort. Such a control can also allow a user to view different portions of the Forum via a 3D model.

Another contemplated control includes audio control 444, which can allow a user to change an audio characteristic associated with one or more feeds. For example, a user interested in viewing a concert, speech, debate or other event may want to listen to audio associated with different feeds simultaneously or sequentially before selecting a feed for long term viewing. Control 444 can advantageously allow the user to control which audio feed(s) are turned on, a volume of the audio feed, a clarity of the audio feed, a bass of the audio feed, or any other suitable audio characteristic associated with a feed. In some embodiments, control 444 can also advantageously include a scan setting that allows a user to scan each of a set of feeds sequentially (e.g., for 1, 5, 10, 20 seconds, etc.) without a user input.

Yet another contemplated control includes an indicator control 446, which can allow a user to select the type of cluster indicator 434 that is presented to a user. For example, a user can press control 446 on the screen and be presented with a pop-up or drop-down menu of available indicators suitable for the experience feed being displayed. As discussed above, a cluster indicator can comprise a visual or non-visual indicator that indicates a match to a metric. It is contemplated that a cluster indicator can be three-dimensional in nature to provide a more realistic virtual experience. For example, an indicator can comprise a cluster of feeds that are presented using three-dimensional display technology, or can comprise a three dimensional view of a portion of a venue from which a set of feeds are acquired. The indicator control or other control can also be configured to allow a user to modify a type of cluster to be indicated. Such a control can allow a viewer to seamlessly switch between experience feeds that are arranged to present clusters based on different dimensions or metrics (e.g., an experience feed having a focal cluster to an experience feed having a proximity cluster indicating the devices located in closest proximity to a selected location, etc.).

The following possible use case provides an illustration of some of the ways a user can interact with user interface 400 to obtain one or more cluster indicators 434 sequentially or simultaneously. Brandi teaches an online fashion design course and has 500 students nationwide in attendance. Via her user interface, Brandi can obtain an experience feed including an arrangement of feeds acquired by her students in attendance. Using interface 400 as an example, Brandi can utilize space shift control to navigate through the 500 different feeds. Brandi can use cluster indicator control 446 to select a cluster she wants an indication of, for example, all video feeds captured by students who have indicated that they would like their designs reviewed. This cluster indicator can indicate the order in which the students provided an indication that their designs were ready for review (e.g., via an arrangement, via numbering, etc.). As the number of students wanting a design reviewed could change over the time, it is contemplated that the cluster indicator, or an indication of an order in which requests were made, could be updated on a regular basis (e.g., every 10 seconds, every 60 seconds, every 120 seconds, etc.). User interface 400 can also include a control that allows Brandi to remove a feed from a cluster upon completion of a review.

As shown in the above use case, it is contemplated that a cluster indicator can change with time. This change can be based on a change in feeds that best match a metric (e.g., the feeds that capture a specific focal zone can change over time, etc.), or can be dynamic and based on a change in the indication being presented (e.g., a cluster indicates a focal cluster, then indicates a relevancy cluster, etc.).

One should appreciate that the arrangement of an experience feed can be modified in order to present the feeds indicated by a cluster indicator adjacently to one another. Thus, an updated or modified cluster indicator could require a change in the arrangement of the feeds. It is also contemplated that a cluster indicator could indicate feeds that are not presented adjacent to one another. For example, a cluster indicator can comprise a symbol, an enlargement, a grayscale conversion, or other indication next to, under, within, or above the relevant feeds of a cluster.

Further examples of contemplated controls include, among other things: time shift control 442, which can allow a user to pause, stop, play, rewind, fast-forward, or otherwise navigate through a length of a feed; zoom control 450, which can allow a user to zoom in or out of one or more feeds or;

preferences control 452, which can allow a user to view and modify preferences associated with an event, experience policy or experience feed; type control 454, which can allow a user to select the type(s) of feeds desired (e.g., text, video, image, audio, etc.); speaker control 456, which can allow a user to provide input via a voice command; or a view control, which can allow a user to switch between a third person view and a first person or other view to seamlessly navigate through a 2D or 3D model of a venue.

One should appreciate that while some controls are discussed herein, all commercially suitable controls that can enhance a remote viewing experience or assist a user in interacting with an experience feed are contemplated.

Figure 5:
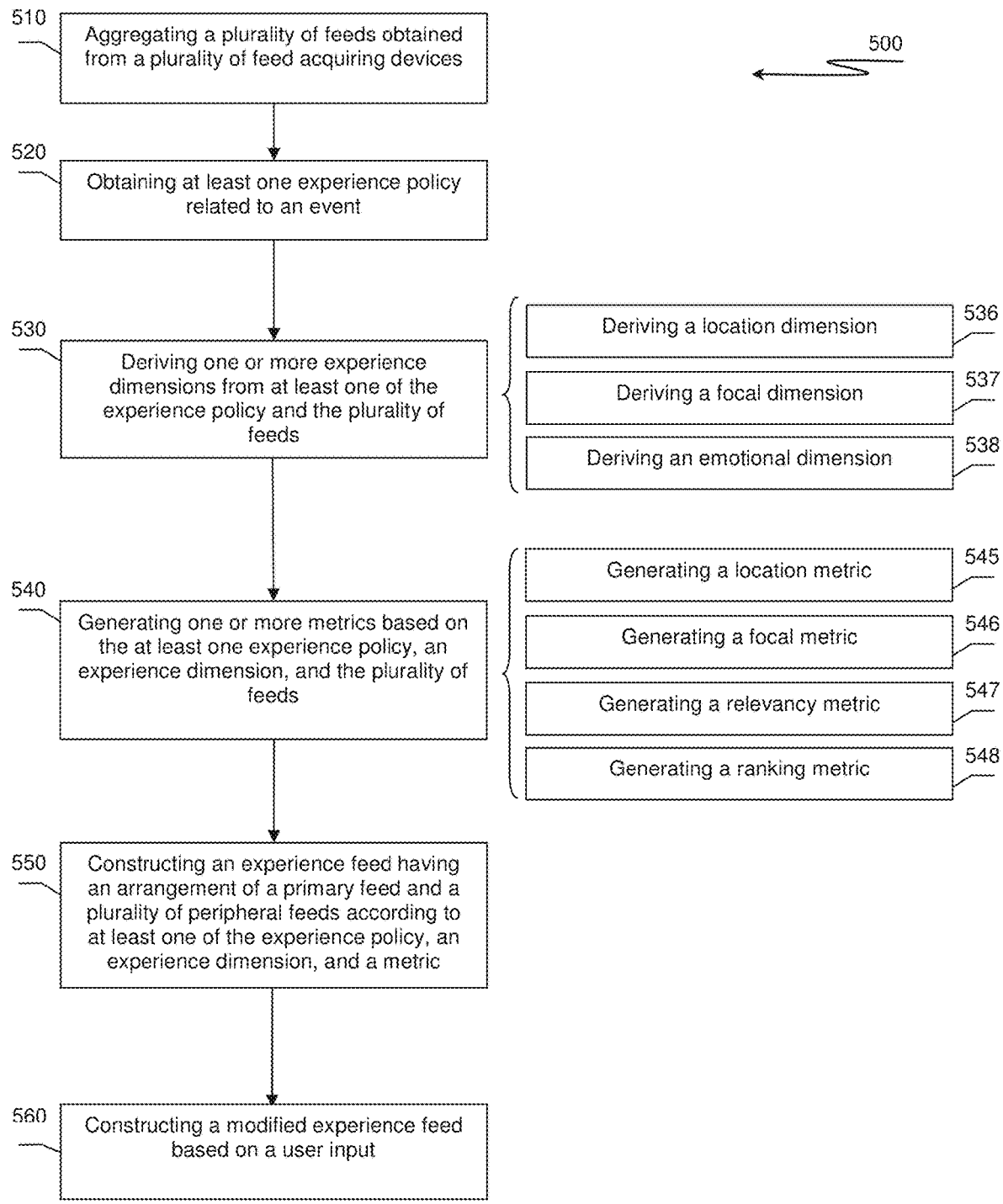
FIG. 5 presents a method executable by a feed aggregation engine of the inventive subject matter.

FIG. 5 illustrates a method 500 executable by a feed aggregation engine of the inventive subject matter. Method 500 includes a method of constructing an experience feed for presentation via an experience feed interface.

Step 510 can include the step of aggregating a plurality of feeds related to an event, which can be obtained from a plurality of feed acquiring devices. While some of the above examples are directed to a music events, one should appreciate that all suitable events are contemplated, including for example, a concert, a sporting event, a live action game (e.g., poker, chess, etc.), a vacation, a disaster, a news story, an expedition, a traffic event, a live event, a flash mob, a fashion show, a shopping event, a reality event, an accident, an emergency, a party, a premier, or other type of events. It is contemplated that an event can be represented as a data structure describing a characteristic of an event (e.g., an event object) as described in parent patent application Ser. No. 13/912,567, filed on Jun. 7, 2013.

As shown in FIG. 1, the plurality of feeds can be acquired over a network in real-time or substantially real-time from devices located in different portions of a venue. It is contemplated that the plurality of feeds related to an event can comprise the same or different data modalities (e.g., image, sound, video, etc.), and that the different modalities can be indicated by one or more cluster indicators. Moreover, the nature of an event can impact the types of feeds acquired. For example, where an event comprises a fashion show, video feeds may be of more interest to viewers than audio feeds. Where an event comprises a concert, video and audio feeds may be of equal or similar importance to viewers. One should also appreciate that the nature of an event can impact the feed acquiring devices utilized at an event. For example, mobile phones, handheld video cameras, cameras, audio recorders or other compact devices may be of greater value for a crowded event (e.g., a musical festival, etc.). However, a desktop computer, laptop, kiosk or other larger devices having greater capabilities may be of greater value for an event having designated areas for broadcasters.

Step 520 can include the step of obtaining at least one experience policy related to the event. As discussed above, an experience policy can be generated by a policy generation module based on data obtained from one or more persons or entities. The experience policy can then be transmitted to the feed aggregation engine over a network and comprise instructions to be executed by the feed aggregation engine to construct an experience feed having one or more cluster indicators and an arrangement of feeds according to the experience policy.

Step 530 can include the step of deriving one or more experience dimensions from at least one of an experience policy and the plurality of feeds. It can generally be preferred that the step of deriving one or more experience dimensions can comprise deriving at least one of a location dimension, focal dimension, or an emotional dimension as shown in steps 536, 537 and 538, respectively, which can be used to optimize customization of an experience feed to be presented to a user. One should appreciate that dimensions can be derived based on input provided by one or more persons or entities, or from sensor data captured by one or more feed acquiring devices or user devices. It should also be appreciated that the dimensions derived based on the inputs provided can be used to derive a set of indications that would be of interest to one or more users.

Sensor data can represent dimensions of human experience within ordinary human senses (e.g., image data, audio data, video data, etc.), or can represent dimensions outside ordinary human senses (e.g., time data, location data, orientation, position, acceleration, movement, temperature, metadata, user data, health, olfactory, sound, kinesthetic, or other types of modal data). It is also contemplated that sensor data can represent dimensions of human experience that cannot be directly experienced via a user device (e.g., a smell, taste, etc.). In such embodiments, it is possible that the sensor data can be reduced to a dimension that can be experienced via the user device (e.g., a visual or audio representation of the smell, etc.).

Step 540 can include the step of generating one or more metrics based on at least one of an experience policy, an experience dimension and a plurality of feeds. As described above, the metric can provide a value that is associated with an experience dimension. It is contemplated that the step of generating one or more metrics can include the step of generating at least one of a location metric, focal metric, relevancy metric or ranking metric as shown in steps 545, 546, 547 and 548, respectively. One should appreciate that one or more of the metrics generated could be used in conjunction with a set of indicators derived from dimensions to determine which feeds, if any, should be included in a cluster to be identified by a cluster indicator.

Step 550 can include the step of constructing an experience feed. The experience feed can have an arrangement of a primary feed and a plurality of peripheral feeds according to at least one of an experience policy, an experience dimension and a metric, and can include one or more cluster indicators according to at least one of the aforementioned. One should appreciate that constructing an experience feed having such an arrangement can include executing instructions included in, or derived from, terms of the experience policy.

In some preferred embodiments, the experience feed can be constructed based on each of an experience policy, a plurality of experience dimensions and a plurality of experience metrics. A goal of a system of the inventive subject matter is to provide experience feeds that are constructed to be optimally customized to a user. One should appreciate that this goal can be furthered by utilizing emotional data related to a viewer in order to create a feed that matches a feeling desired by the user, or a feed that can influence a user's feelings. For example, data obtained from a user can indicate that a user is particularly sensitive to loud and angry noises. Based on this data, an experience feed can be constructed to exclude loud angry noises by, for example, excluding audio, or focusing on individual conversations rather than a loud performer. Alternatively or additionally, an experience can be constructed to intentionally include loud or angry feeds in an effort to influence the user's reaction or sensitivity to such noises.

To further achieve the aforementioned goal, step 560 can include the step of constructing a modified experience feed based on a user input. Examples of constructing a modified experience feed based on a user input can include modifying an arrangement of feeds to be presented; modifying one or more cluster indicator types or groupings; modifying a size, color or other visual element; modifying an audio component; or any other suitable modification based on a user input or change in preference. While the step of constructing the modified experience feed can be completed independently of an experience policy, it is contemplated that the step can include modifying an underlying experience policy of a user and constructing a modified experience feed having an arrangement according to the modified experience policy.

It should also be appreciated that an experience policy can be dynamic in nature, in which the experience feed can be automatically modified without a user or other input. In other words, an experience policy can comprise one or more secondary instructions, which are to be executed upon a pre-determined occurrence to modify a characteristic of the experience feed. Examples of experience feed elements that can be dynamic in nature include, among other things, cluster groupings, indicator types, dimension or metric a cluster indicates, designation of a feed as a primary feed, size or location of a feed, control types, or any other suitable experience feed elements.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of sharing an experience between a tapper and a content provider, comprising:

providing at least first and second interfaces, configured to allow the tapper and the content provider to join a content sharing community;

providing at least a third interface configured to allow the tapper to select the content provider from a map, and wherein at least one of the tapper and the content provider are unknown to the other prior to the tapper selecting the content provider;

conveying a solicitation from the tapper to the content provider to provide a video feed of an event;

obtaining a video feed derived from a device operated or carried by the content provider, wherein the video feed comprises a near-real time, first-person experience of an environment of the content provider;

recognizing, by one or more computer processors, an object in the video feed;

determining an experience policy for the video feed based at least in part on the recognized object, wherein the experience policy comprises one or more rules associated with a compensation scheme associated with a content provider, using historical behavioral data of the content provider to determine the compensation scheme for the content provider for at least one bid from at least one tapper.

2. The method of claim 1, further comprising aborting the conveyance of the video feed to the tapper according to the experience policy.

3. The method of claim 1, further comprising conveying the video feed to the tapper based on both the experience policy and a profile of the tapper.

4. The method of claim 1, further comprising providing a fourth interface that allows a manager of the event, who is different from the tapper and the content provider, to generate the experience policy for an object.

5. The method of claim 4, further comprising providing a fourth interface through which a fee is paid to the manager for conveyance of at least one intellectual property right with respect to the event or the video feed.

6. The method of claim 1, wherein the experience policy comprises a fee policy.

7. The method of claim 6, further comprising providing a fourth interface that allows the tapper to pay a monetary amount in exchange for access to the video feed.

* * * * *